2,956,972
Patented Oct. 18, 1960

2,956,972

CALKING AND SEALING COMPOSITION CONTAINING SYNTHETIC CONJUGATED DIOLEFIN COPOLYMERS

George B. Sterling, Midland, Mich., assignor to The Dow Chemical Company, Midland, Mich., a corporation of Delaware No Drawing. Filed Mar. 5, 1958, Ser. No. 719,202

5 Claims. (Cl. 260—23.7)

This invention concerns new compositions of matter suitable for sealing cracks, crevices, joints and leaks to make them waterproof and pertains especially to such compositions containing soft elastomeric copolymers of conjugated diolefins and certain monoethylenically unsaturated vinyl or vinylidene compounds, which compositions are characterized by their adhesiveness, flexibility and alkali-, acid- and water-resistant properties.

Compositions for sealing cracks, crevices, joints and leaks to make them waterproof are commonly prepared by compounding or blending a drying oil, e.g. linseed oil, with a filler such as finely divided clay, talc, or short asbestos fibers and a solvent to form a paste or putty-like material which can be pressed or forced into cracks, crevices or fissures by ordinary hand pressure or from a calking gun, thereby making them waterproof.

However, such sealing compositions have not been entirely satisfactory for the reasons that the compositions have a tendency to become brittle and crack upon exposure to out-of-doors weathering and rapidly lose their adhesiveness.

It is an object of the invention to provide new sealing compositions for making cracks, crevices, fissures and joints waterproof which compositions are characterized by adhesiveness and good resistance to embrittling and cracking upon exposure to out-of-doors weathering. Another object is to provide sealing compositions comprised of soft elastomeric copolymers of conjugated diolefins and certain monoethylenically unsaturated vinylidene compounds, which copolymers are blended with fillers to form putty-like materials which can be pressed into cracks, crevices, fissures, joints and the like by ordinary hand pressure, and which compositions possess good adhesiveness and high resistance to embrittling upon exposure to out-of-doors weathering.

According to the invention a sealing composition possessing superior adhesive properties and excellent resistance to embrittling upon exposure to out-of-doors weathering can readily be prepared by incorporating a soft elastomeric copolymer of a conjugated diolefin such as butadiene or isoprene and a monoethylenically unsaturated organic compound copolymerizable therewith, e.g. methyl isopropenyl ketone, styrene, ar-dichlorostyrene, or lower alkyl esters of acrylic acid, with inert inorganic fillers such as clay, talc, asbestos fibers, silica, barium sulfate, calcium carbonate or the like, together with a plasticizer and a solvent as hereinafter described.

The synthetic elastomers to be employed in the compositions can be a copolymer of from 45 to 80 percent by weight of butadiene or isoprene and from 55 to 20 percent of methyl isopropenyl ketone or a monovinyl aromatic compound of the benzene series such as styrene, vinyltoluene, vinylxylene, ethylvinylbenzene, isopropylstyrene, ar-dichlorostyrene, i.e. styrene, a nuclear alkyl styrene or a nuclear halogenated styrene, or a copolymer of from 45 to 80 percent by weight of butadiene or isoprene, from 50 to 20 percent of methyl isopropenyl ketone or a monovinyl aromatic compound and from 5 to 25 percent of a lower alkyl ester of acrylic acid containing from 1 to 4 carbon atoms in the alkyl group.

It is important that the elastomeric copolymers contain the monomeric ingredients chemically combined or interpolymerized with one another in the aforesaid proportions, and that the elastomers possess a molecular weight corresponding to a viscosity characteristic for the copolymer of from 6 to 10 millipoises as determined for a one weight percent solution of the copolymer in toluene at 25° C. in order that the copolymers possess physical properties such as tack, flexibility and flow, suitable for making the sealing compositions of the invention. The copolymers are employed in amount corresponding to from 10 to 50 percent by weight of the final composition.

The synthetic elastomers can be prepared in usual ways by carrying out the polymerization of a mixture of the monomers in an aqueous emulsion at temperatures between about 0° and 100° C. The molecular weight of the copolymer can be controlled by carrying out the polymerization in the presence of a mercaptan modifier in amount sufficient to give a copolymer having a molecular weight within the range previously stated, suitably tert.-dodecyl mercaptan, in amounts of from about 2 to 8, preferably from 2 to 6, percent by weight of the monomers initially used. The copolymer is recovered by coagulating the synthetic latex and is washed and dried.

Small amounts of antioxidants such as 2,6-di-tert.-butyl-4-methylphenol or 2,4-dimethyl-6-(2-methylcyclohexyl)phenol are advantageously incorporated with the rubbery elastomer in amounts of from 2 to 5 percent by weight of the copolymer. The antioxidants are suitably incorporated with the latex prior to coagulating and recovering the copolymer.

The inorganic filler can be a material such as finely divided clay, calcium carbonate, barium sulfate, silica, ground mineral wool or asbestos fibers, zinc oxide, lithopone, talc or the like. The preferred inorganic fillers are fibrous talc, clay and short asbestos fibers or mixtures thereof. The inorganic fillers can be used in amounts of from 30 to 80 percent by weight of the composition.

Plasticizers such as mineral or vegetable oils, preferably the latter in the form of heat-bodied drying oils such as linseed oil, dehydrogenated castor oil, tung oil, soy bean oil or the like, having a viscosity between Z1 and Z9 (Gardner-Holt) are employed in amounts of from 5 to 25 percent by weight of the composition.

A liquid aliphatic hydrocarbon solvent consisting principally of saturated aliphatic hydrocarbons boiling at temperatures between 60° and 205° C., e.g. petroleum ether, is usually required in the composition. The thinner can be employed in amounts of from 5 to 15 percent by weight of the composition.

The compositions are prepared by incorporating the elastomeric copolymer with the inert organic filler, the drying oil plasticizer and the saturated aliphatic hydrocarbon solvent or thinner in the desired proportions, on compounding rolls, a Banbury mixer or a plastics extruder, to form a uniform homogeneous plastic material having a soft to stiff dough-like consistency and capable of being forced into a ⅛-inch crack or crevice by ordinary hand pressure. The consistency of the composition will vary somewhat depending upon the intended use. The composition should not be thinned to such an extent that it sags when subjected to a sag or slump test such as that described in the bulletin published July 15, 1955, by the Aluminum Window Manufacturing Association, 75 West Street, New York 6, New York, and should not be so stiff that it cannot readily be forced from a calking gun by hand pressure.

The compositions of the invention do not sag or flow of their own weight when a triangular body of the material is formed in a 1-inch wide by ½-inch deep channel and placed in an oven in a vertical position with the 1-inch side of the triangular mass in a vertical position and the apex of the triangular body on the bottom and heated at a temperature of 50° C. for a period of 8 hours.

The compositions of the invention possess good adhesiveness to metal, wood or glass, have excellent resistance to embrittling and cracking upon exposure to out-of-doors weathering, do not tend to sag or wrinkle and are useful for sealing cracks, crevices, joints, fissures and the glazing of window glass to make them waterproof.

The following examples illustrate ways in which the principle of the invention has been applied, but are not to be construed as limiting its scope.

EXAMPLE 1

In each of a series of experiments, a copolymer of butadiene or isoprene and styrene was prepared by polymerizing a mixture of the monomers in proportions as stated in the following table in an aqueous emulsion employing the recipe:

| Ingredients— | Parts by weight |
|---|---|
| Monomers | 100 |
| Water | 150 |
| Dresinate 214 (disproportionated rosin acid-potassium salt) | 4 |
| Versene (ethylenediamine tetra acetic acid-sodium salt) | 0.14 |
| Diisopropyl benzene hydroperoxide | 0.3 |
| Sodium formaldehyde sulfoxylate | 0.3 |
| $FeCl_3 \cdot 6H_2O$ | 0.07 |
| KOH | 0.15 |
| KCl | 0.3 |
| tert.-Dodecyl mercaptan | 5 |

The ingredients were placed in a pressure resistant vessel equipped with a stirrer and means for heating and cooling the contents. The mixture was cooled to 5° C. and vigorously agitated to effect emulsification, then stirred and maintained at a temperature of 5° C. for a period of 6 hours to polymerize the monomers. The copolymer was obtained in the form of a synthetic latex. There was added to the latex with stirring an aqueous emulsion containing 3 percent by weight, based on the weight of the copolymer, of 2,4-dimethyl-6-(2-methylcyclohexyl)phenol as antioxidant. Thereafter the latex was coagulated and the copolymer was separated and was washed with water and dried.

A viscosity characteristic for the copolymer was determined by dissolving a portion of the copolymer in toluene to form a solution containing one percent by weight of the copolymer and determining the absolute viscosity in millipoises of the solution at 25° C. All of the copolymers were soft tacky materials.

A calking composition was prepared by compounding a portion of the polymer together with added ingredients as stated in the following table on a pair of laboratory rolls to form a homogeneous composition.

The calking composition was employed to seal a 4 x 8 inch glass window pane in a wood frame. The unit was exposed to out-of-doors weathering for a period of 12 months at about latitude 25° north in the State of Florida. The calking was observed from time to time for signs of deterioration. Table I identifies the copolymer by giving the proportions in percent by weight of the butadiene or isoprene and styrene from which it was prepared and gives a viscosity characteristic for the copolymer in millipoises. The table also gives the proportions and kinds of ingredients employed in preparing the calking composition. The table gives the characteristics of the calking composition as initially prepared and the conditions of the calking after exposure to out-of-doors weathering for a period of 12 months. In the table, the symbol MIK is employed to designate methyl isopropenyl ketone for brevity.

Other portions of the composition were tested for sag. The procedure for determining sag for the composition was to fill a steel channel 1-inch wide by ½-inch deep by 8 inches long made from No. 28 U.S. guage metal with a triangular body of the composition and place the so-filled channel in an oven with the 1-inch side of the right angle of the body of the material in a vertical position and the point of the triangular body of the material on the bottom of the channel and heat the mass at a temperature of 50° C. for a period of 7 hours. Thereafter, the material was observed for sagging or slumping of the material towards the bottom of the channel.

*Table I*

| | Copolymer | | | Copolymer Viscosity Millipoises | Calking Composition | | | | | | | Remarks |
|---|---|---|---|---|---|---|---|---|---|---|---|---|
| Run No. | Butadiene, percent | MIK, percent | Styrene, percent | | Copolymer, percent | Clay,[a] percent | Talc,[b] percent | Asbestos shorts, percent | Linseed oil Z7-Z8, percent | Skelly Solvent 60°–100° C., percent | Skelly Solvent 100–140° C., percent | |
| 1 | 70 | 30 | 0 | 8.3 | 50 | 6 | 24 | 5 | 10 | 5 | 0 | Slight stiff—no sag—guns well—no cracks after exposure. |
| 2 | 80 | 20 | 0 | 7.1 | 20 | 5 | 30 | 15 | 15 | 5 | 10 | Soft—no sag—guns well—no cracks after exposure. |
| 3 | 80 | 0 | 20 | 9.6 | 20 | 5 | 30 | 15 | 15 | 5 | 10 | Slight stiff—no sag—guns well—no cracks after exposure. |
| 4 | 50 | 50 | 0 | 7.8 | 19 | 4.7 | 28.7 | 14.3 | 14.3 | 4.7 | 14.3 | Slight stiff—no sag—guns fair—no cracks after exposure. |

[a] Clay No. 33, obtained from Southern Clay Inc. It was a finely divided insert material of a cream color having 38 percent by weight of its particles of sizes below 2 mirrors and consisted of 43.75 percent by weight of $Al_2O_3$, 54.0 percent $SiO_2$, 0.25 percent $Fe_2O_3$, 0.75 percent $TiO_2$ and 1.25 percent $K_2O \cdot Na_2O$, by analysis.
[b] A fibrous talc.

EXAMPLE 2

A copolymer of methyl isopropenyl ketone, butadiene and styrene was prepared by polymerizing a mixture of the monomers in an aqueous emulsion employing the recipe:

| Ingredients— | Parts by weight |
|---|---|
| Methyl isopropenyl ketone | 20 |
| Butadiene | 60 |
| Styrene | 20 |
| Water | 110 |
| Duponol WAQ (fatty alcohol sodium sulfate) | 0.85 |
| Potassium persulfate | 0.75 |
| $NaHCO_3$ | 1.0 |
| tert.-Dodecyl mercaptan | 5.0 |

The ingredients were placed in a pressure resistant vessel equipped with a stirrer and means for heating and cooling the contents. The mixture was agitated to effect emulsification, then heated at a temperature of 60° C. with mild stirring for a period of 15 hours to polymerize the monomers. The copolymer was obtained in the form of a synthetic latex. An aqueous emulsion containing 4 percent by weight, based on the weight of the copolymer, of 2,4-dimethyl-6-(2-methylcyclohexyl)phenol was added to the latex with stirring. The copolymer was recovered by coagulating the latex. It was washed with water and dried. A portion of the polymer was dissolved in toluene to form a solution containing one percent by weight of the copolymer. The solution had an absolute viscosity of 6.43 millipoises at 25° C. A calking composition was prepared by milling a portion of the copolymer with other ingredients on compounding rolls employing the recipe:

| Ingredients— | Parts by weight |
|---|---|
| Copolymer | 20 |
| Clay No. 33 [1] | 4 |
| Nytol 200 (a fibrous talc) | 38 |
| Skelly solvent (B.P. 100–140° C.) | 5 |
| Skelly solvent (B.P. 150–205) | 5 |
| Asbestos fibers (shorts) | 13 |
| Bodied Linseed oil (Z7–Z8 viscosity) | 15 |

[1] Same clay as employed in Example 1.

The composition was a uniform soft plastic mass. It could readily be extruded from a calking gun with moderate hand pressure and when used to seal window glass in a frame showed no tendency to sag.

EXAMPLE 3

A copolymer of 30 percent by weight of methyl isopropenyl ketone and 70 percent of butadiene was prepared by polymerizing a mixture of the monomers employing a procedure and recipe as described in Example 2. The copolymer was recovered from the latex and was washed with water and dried without adding any stabilizing agent or antioxidant thereto. A solution of toluene containing one percent by weight of the copolymer had an absolute viscosity of 6.55 millipoises at 25° C. A solution of the copolymer was cast onto a glass plate and the solvent evaporated. A clear film 10 mils thick was obtained. The film was heated at a temperature of 100° C. in an air oven for a period of 10 days. No discoloring of the film was observed. Other films of the copolymer remained clear after exposure in a Fadeometer for a period of 100 hours. A calking composition was prepared by compounding a portion of the copolymer, together with other ingredients into a homogeneous mass employing the recipe:

| Ingredients— | Parts by weight |
|---|---|
| Copolymer | 20 |
| Clay No. 33 | 4 |
| Nytol 200 (a fibrous talc) | 38 |
| Skelly solvent (B.P. 100–140° C.) | 5 |
| Skelly solvent (B.P. 150–205° C.) | 5 |
| Asbestos fibers (shorts) | 13 |
| Bodied Linseed oil (Z7–Z8 viscosity) | 13 |

The calking composition could readily be extruded from a calking gun with moderate hand pressure and when used to seal crevices, cracks or window glass was waterproof and showed no tendency to sag or to become embrittled upon aging by exposure to out-of-doors weathering for a period of 12 months.

EXAMPLE 4

A copolymer of 30 percent by weight of methyl isopropenyl ketone and 70 percent of isoprene was prepared employing a procedure and recipe similar to those employed in Example 2. A solution of toluene containing one percent by weight of the copolymer had an absolute viscosity of 6.47 millipoises at 25° C. Films of the copolymer were cast and tested as described in Example 3. The film had a light yellow color after heating at 100° C. in an air oven for a period of 10 days. After exposure of a test film of the copolymer in a Fadeometer for a period of 112 hours, the color of the film was not changed. A calking composition was prepared from a portion of the copolymer and other ingredients employing the recipe employed in Example 3. The calking composition was similar to that obtained in the preceding example.

EXAMPLE 5

A copolymer of 20 percent by weight of methyl isopropenyl ketone, 60 percent of butadiene and 20 percent of ar-dichlorostyrenes (a mixture of about 35 percent by weight of 2,5-dichlorostyrene, 46 percent 2,4-dichlorostyrene, 13 percent 2,3-dichlorostyrene, 4 percent 2,6-dichlorostyrene and 2 percent of 3,4-dichlorostyrene) was prepared by polymerizing a mixture of the monomers in an aqueous emulsion employing a procedure and recipe similar to those employed in Example 2. The copolymer had a viscosity characteristic of 6.43 millipoises as determined for a one weight percent solution of the copolymer in toluene at 25° C. A calking composition was prepared from a portion of the copolymer by compounding it with other ingredients employing the recipe given in Example 3. The calking composition was readily extruded through a calking gun and had good adherence to wood, glass or metal and showed no tendency to sag or to become embrittled upon ageing by exposure to out-of-doors weathering for a period of 12 months.

EXAMPLE 6

A copolymer of 60 percent by weight of butadiene, 20 percent of methyl isopropenyl ketone and 20 percent of ethyl acrylate was prepared employing a procedure and recipe similar to those described in Example 2. The copolymer had a viscosity characteristic of 6.46 millipoises (determined on a one weight percent solution of the copolymer in toluene at 25° C.). This copolymer when compounded with other ingredients employing a recipe similar to that employed in Example 3 formed a calking composition that was readily extruded from a calking gun with moderate hand pressure. The composition had good adhesion to wood, glass or metal and remained flexible after exposure to out-of-doors weathering for prolonged periods of time.

EXAMPLE 7

A copolymer of 40 percent by weight of methyl isopropenyl ketone, 15 percent of styrene and 45 percent of butadiene was prepared by polymerizing a mixture of the monomers in an aqueous emulsion employing a procedure and recipe as described in Example 1. The copolymer had a viscosity characteristic of 7.25 millipoises (determined for a one weight percent solution of the copolymer in toluene at 25° C.).

A calking composition was prepared from the copolymer, together with other ingredients, employing a recipe similar to that employed in Example 3. The composition was readily extruded from a calking gun under moderate hand pressure and had good adherence to wood, glass or metal and showed no tendency to sag.

EXAMPLE 8

A copolymer of 60 percent by weight of isoprene, 20 percent of styrene and 20 percent of methyl isopropenyl ketone was prepared by polymerizing a mixture of the monomers in aqueous emulsion employing a procedure and recipe similar to that employed in Example 2. The copolymer had a viscosity characteristic of 6.23 millipoises. A calking composition was prepared by compounding a portion of the tacky copolymer with other ingredients on compounding rolls employing the recipe:

| Ingredients— | Parts by weight |
|---|---|
| Copolymer | 15 |
| Clay | 5 |
| Talc | 30 |
| Skelly solvent (B.P. 60°–100° C.) | 10 |
| Skelly solvent (B.P. 100°–140° C.) | 5 |
| Linseed oil (Z7–Z8 viscosity | 20 |
| Asbestos shorts | 15 |

The calking composition was a soft dough and was readily forced from a calking gun under moderate hand pressure and had good adherence to wood, metal or glass.

EXAMPLE 9

A copolymer of 70 percent by weight of butadiene and 30 percent of ar-dichlorostyrene was prepared by polymerizing a mixture of the monomers in an aqueous emulsion employing a procedure and recipe as described in Example 2. An aqueous emulsion containing 3 percent by weight of 2,4-dimethyl-6-(2-methylcyclohexyl)phenol, based on the weight of the copolymer, was added to the latex as stabilizer, after which the latex was coagulated and the copolymer was separated, washed and dried. The copolymer was a soft tacky material having a viscosity characteristic of 6.23 millipoises as determined for a one weight percent solution of the copolymer in toluene at 25° C. A calking and sealing composition was prepared by milling a portion of the copolymer, together with other ingredients on compounding rolls to form a uniform composition employing the recipe employed in Example 2. The composition was a soft tacky mass having good adhesion to wood, metal or glass. It could readily be extruded from a calking gun with moderate hand pressure.

I claim:

1. A calking composition for sealing crevices, cracks, leaks and joints to make them waterproof which comprises a homogeneous intimate mixture of (A) from 10 to 50 percent by weight of a soft elastomeric copolymer having a viscosity characteristic corresponding to an absolute viscosity between 6 and 10 millipoises determined for a one weight percent solution of the copolymer in toluene at 25° C., which copolymer is a member of the class consisting of (1) copolymers of from 45 to 80 percent by weight of at least one conjugated diolefin of the class consisting of butadiene and isoprene and from 55 to 20 percent of at least one monoethylenically unsaturated organic compound selected from the group consisting of methyl isopropenyl ketone and monovinyl aromatic hydrocarbons of the benzene series and nuclear halogenated derivatives thereof and (2) copolymers of from 45 to 80 percent by weight of at least one monomer selected from the group consisting of butadiene and isoprene, from 50 to 20 percent of at least one monoethylenically unsaturated organic compound selected from the group consisting of methyl isopropenyl ketone and monovinyl aromatic hydrocarbons of the benzene series and nuclear halogenated derivatives thereof and from 5 to 25 percent of an alkyl ester of acrylic acid containing from 1 to 4 carbon atoms in the alkyl group, (B) from 5 to 25 percent by weight of a bodied drying oil having a viscosity between Z1 and Z9 (Gardner-Holdt), (C) from 5 to 15 percent by weight of a liquid hydrocarbon solvent consisting principally of saturated aliphatic hydrocarbons boiling at temperatures between 60° and 205° C. and (D) from 30 to 80 percent by weight of a filler selected from the group consisting of talc, clay and asbestos fibers and mixtures thereof per 100 parts by weight of said composition.

2. A composition as claimed in claim 1, wherein the soft elastomeric copolymer is a copolymer of from 45 to 80 percent by weight of at least one conjugated diolefin selected from the group consisting of butadiene and isoprene and from 55 to 20 percent of methyl isopropenyl ketone.

3. A composition as claimed in claim 1, wherein the soft elastomeric copolymer is a copolymer of from 45 to 80 percent by weight of at least one conjugated diolefin selected from the group consisting of butadiene and isoprene, from 50 to 20 percent of methyl isopropenyl ketone and from 5 to 25 percent of ar-dichlorostyrene.

4. A calking composition for sealing crevices, cracks, leaks and joints to make them waterproof which comprises a homogeneous intimate mixture of (A) from 10 to 50 percent by weight of a soft elastomeric copolymer of from 45 to 80 percent by weight of butadiene and from 55 to 20 percent of methyl isopropenyl ketone, said copolymer having a viscosity characteristic corresponding to an absolute viscosity of from 6 to 10 millipoises determined for a one percent solution of the copolymer in toluene at 25° C., (B) from 5 to 25 percent by weight of a bodied linseed oil having a viscosity between Z1 and Z9 (Gardner-Holdt) (C) from 5 to 15 percent by weight of a liquid saturated aliphatic hydrocarbon solvent boiling at temperatures between 60° and 205° C. and (D) from 30 to 80 percent by weight of a filler selected from the group consisting of talc, clay and asbestos fibers and mixtures thereof per 100 parts by weight of the composition.

5. A calking composition for sealing crevices, cracks, leaks and joints to make them waterproof which comprises a homogeneous intimate mixture of (A) from 10 to 50 percent by weight of a soft elastomeric copolymer of from 45 to 80 percent by weight of butadiene, from 50 to 20 percent of methyl isopropenyl ketone and from 5 to 25 percent of ar-dichlorostyrene, said copolymer having a viscosity characteristic corresponding to an absolute viscosity of from 6 to 10 millipoises determined for a one weight percent solution of the copolymer in toluene at 25° C., (B) from 5 to 25 percent by weight of bodied linseed oil having a viscosity between Z1 and Z9 (Gardner-Holdt) (C) from 5 to 15 percent by weight of a saturated aliphatic hydrocarbon solvent boiling between 60° and 205° C. and (D) from 30 to 80 percent by weight of a filler selected from the group consisting of talc, clay and asbestos fibers and mixtures thereof per 100 parts by weight of the composition.

References Cited in the file of this patent

UNITED STATES PATENTS

| 2,402,909 | Novak | June 25, 1946 |
| 2,492,124 | Young et al. | Dec. 20, 1949 |
| 2,620,320 | Novak et al. | Dec. 2, 1952 |

FOREIGN PATENTS

| 744,853 | Germany | Nov. 25, 1943 |

OTHER REFERENCES

Gould et al.: Ind. Eng. Chem., 41, 1021–4, 1925–7 (1949).

Rubber Age (N.Y.), 71, 67–70 (1952).

Official Digest Fed. Paint & Varnish Prod. Clubs, No. 347, pp. 969–81 (1953).